United States Patent [19]

Cano et al.

[11] Patent Number: 5,057,658

[45] Date of Patent: Oct. 15, 1991

[54] APPARATUS FOR OIL FILTRATION AND RECIRCULATION

[75] Inventors: Daniel A. Cano, Boise; James L. Buchanan, Mountain Home, both of Id.

[73] Assignee: Micron Technology, Inc., Boise, Id.

[21] Appl. No.: 315,852

[22] Filed: Feb. 27, 1989

[51] Int. Cl.$^5$ ............................................. B01D 35/18
[52] U.S. Cl. .................................. 210/168; 210/195.1; 210/416.5
[58] Field of Search .................. 55/196; 210/167, 168, 210/171, 188, 195.1, 416.5

[56] References Cited

U.S. PATENT DOCUMENTS

| | | | |
|---|---|---|---|
| 4,015,369 | 4/1977 | Dietrick | 210/167 X |
| 4,622,135 | 11/1986 | Williams | 210/167 |
| 4,664,798 | 5/1987 | Bergh | 210/416.5 X |
| 4,772,402 | 9/1988 | Love | 210/195.1 X |
| 4,803,745 | 5/1989 | van der Meulen | 210/168 |
| 4,861,352 | 8/1989 | Cheng | 55/196 X |
| 4,865,749 | 9/1989 | Yoshida | 210/188 X |

Primary Examiner—Charles Hart
Attorney, Agent, or Firm—Stephen A. Gratton; Robert A. de Groot

[57] ABSTRACT

An apparatus for filtering and recirculating oil used in a vacuum pump is disclosed. The filtration device comprises first and second valves permitting, respectively, addition and deletion of oil from the system. A plurality of filter elements are provided to remove particulate contamination from the oil. In a preferred embodiment, the vacuum pump is situated in an enclosure which retains therein the latent heat produced by the vacuum pump. Alternatively, an oil heater may be provided. The oil is preferably maintained at a temperature of greater than about 40° C., so that the particulates entrained therein remain in a sludge.

4 Claims, 2 Drawing Sheets

APPARATUS FOR OIL FILTRATION AND RECIRCULATION

BACKGROUND OF THE INVENTION

Vacuum pumps are well known and widely used in a variety of industrial environments. In the environment of the apparatus of the present invention, vacuum pumps are extensively used to remove reaction gases from process equipment. As an incident to the removal of such gases, certain airborn particulates may also be removed. For instance, in the manufacture of integrated circuits, a number of etching steps are required during which various conductive or nonconductive layers are applied with a stencil, or mask, to a silicon wafer, with the surrounding material being thereafter removed or etched therefrom. Because of the extreme miniaturization of the electrical components in an integrated circuit chip, any particulate contamination of a size greater than about 0.3-0.5 micron can adversely affect the proper perfromance of the finished product. Therefore, vacuums are applied to the hoods, or enclosed spaces, within which the fabrication of such circuits is effected. It is of critical importance that all airborne contamination whether in the form of a gas or particule, be removed from such enclosures.

While the vacuum pumps of the prior art function adequately in many environments, it is not uncommon that the pumps fail prematurely due to ineffective filtration of the recirculating vacuum oil. Further, the addition of make-up oil or a total recharge of oil after an oil change, was difficult to effect. Therefore, it is an object of the present invention to provide an apparatus which will effectively filter recirculating vacuum oil and permit its easy addition to the system.

SUMMARY OF THE INVENTION

The present invention comprises an apparatus for filtering and recirculating particulates. The apparatus may be provided on a movable or portable cart, and comprises means to permit the introduction of an inert gas into the vacuum pump, and means to remove the inert gas and any other gases within the pump. A filtration device comprises first and second valves permitting the introduction of and withdrawal of oil form the system. A plurality of filter elements are provided to remove all particulate contamination from the oil greater than about 0.5 micron.

DETAILED DESCRIPTION OF THE INVENTION

Figure 1:
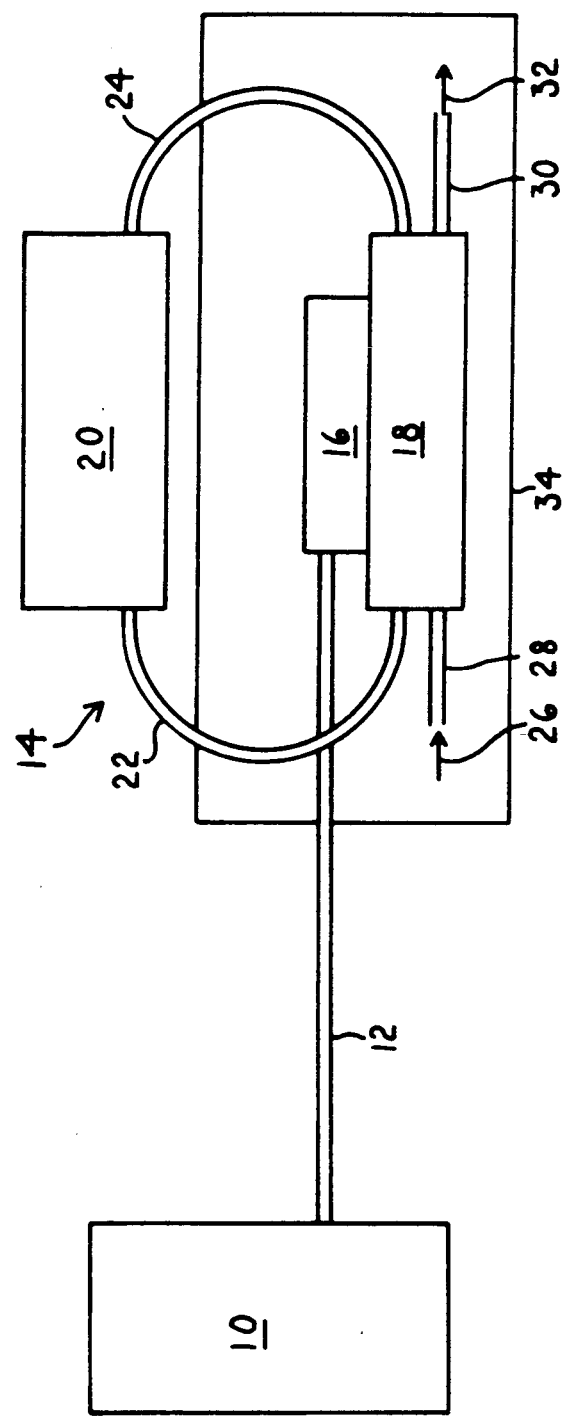
FIG. 1 is a schematic representation of the apparatus of the present invention.

As illustrated schematically in FIG. 1, an enclosed space 10 to be evacuated is interconnected by conduit means 12 to the apparatus 14 of the present invention. As illustrated, the apparatus 14 comprises conventional blower means 16, vacuum pump 18 and a filtration device 20. When operational, air is withdrawn from enclosure 10 and transported through conduit 12 to the blower 16. Any reaction gases or particulates entrained in the air stream conducted through conduit 12 are mixed with the vacuum oil within the blower 16. The oil is then circulated through the vacuum pump 18 and is thereafter directed to the filtration device through conduit 22. After filtering, clean oil is returned to the vacuum pump via conduit 24. Ballast, typically in the form of an inert gas, may be added to the vacuum pump 18 in the direction of arrow 26 through inlet means 28. A vacuum pump purge, or exhaust means 30 removes gases in the direction of arrow 32 from the interior of the vacuum pump 18. An enclosure 34 may surround the vacuum pump in a manner so as to retain a majority of the latent heat within the enclosure.

Figure 2:
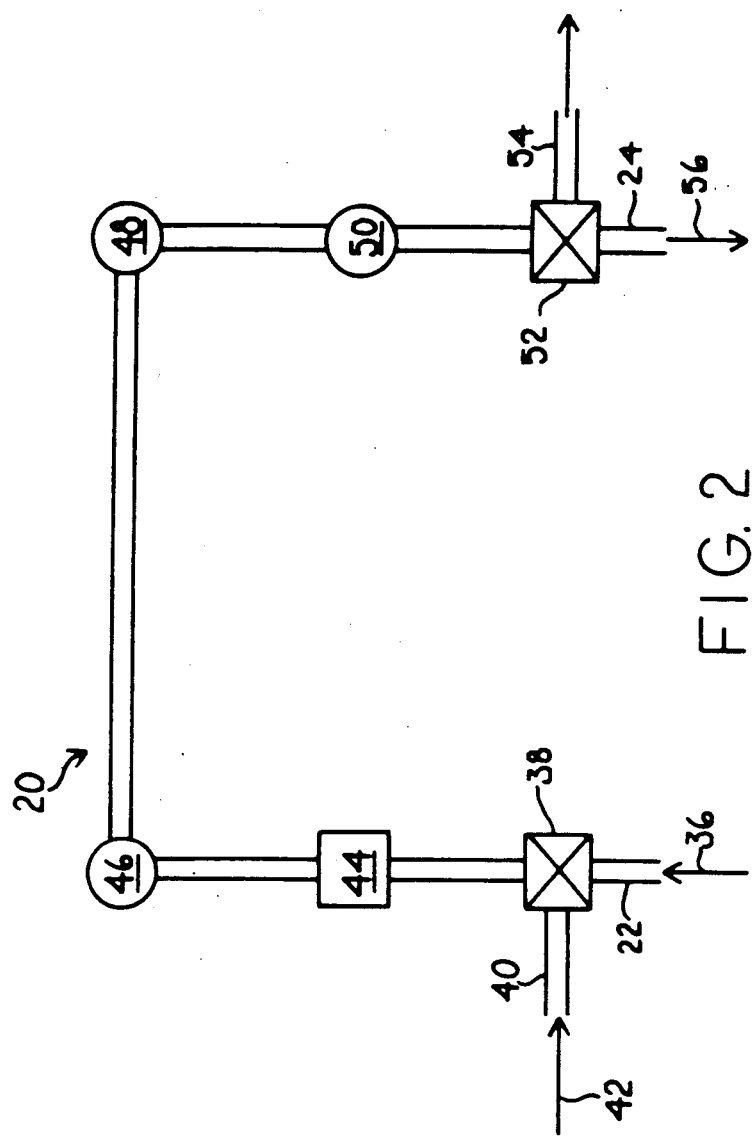
FIG. 2 is a schematic representation of the filtration device of the present invention.

As shown more particularly in the schematic drawing of FIG. 2, the filtration device 20 comprises an inlet conduit 22 introducing vacuum oil from the vacuum pump in the direction of arrow 36. Oil is directed into a first valve 38 which may be conveniently provided with an inlet 40 for the introduction of make-up oil into the system in the direction of arrow 42. Oil may then be conveniently directed through a pump 44 adapted to pump the oil through the filtration device 20.

Upon exiting the pump 44, oil is directed through a plurality of filter elements 46, 48 and 50. Filtered oil is then returned to the vacuum pump through a second valve 52. The valve 52 may be provided with drain means 54 to drain oil from the filtration device for recharge with new oil, or so that the filter media (not shown) within the filter elements 46 may be replaced. Oil is returned to the vacuum pump through the return conduit 24 in the direction of arrow 56.

More specifically, a vacuum pump which may be useful herein is exemplified by a two-stage pump manufactured by Edwards Co., Model No. E2M40. The inert gas utilized herein preferably nitrogen, which serves a dual purpose in this environment. Firstly, the gas facilitates the particulate materials removed from the enclosed space 10 remaining in suspension in the vacuum oil so that they may subsequently be removed by the filter media, and secondly excess nitrogen introduced into the vacuum pump exhausts through the exhaust means 30, carrying with it any undesired reaction gases not entrained in the oil. Therefore, reaction gases not removed by the filter elements may be exhausted from the system by the positive pressure supplied by the nitrogen within the vacuum pump.

The filter media contained within filter elements 46, 48 and 50 must be sufficient to remove suspended particulate contaminants at least as small as about 0.5-0.1 micron in diameter. Applicant has found that conventional pleated-paper filters, such as Filterdyne Model No. 511-581, function adequately for this purpose. It is to be understood that while the schematic representation of the filtration device of FIG. 2 illustrates three filter elements, any reasonable number of filter elements necessary to adequately filter out gaseous particulate contamination may be used.

Applicant has found it desirable to provide our initial filter element to filter out the largest particles (greater than 1.0 micron), a second filter element to filter out particulates as small as 0.5 micron, and a third filter element also to filter out 0.5 micron particulates. Applicant has found that the apparatus of the present invention functions optimally at about 10-12 psi differential between the upstream and downstream sides of the filter elements. When the pressure differential reaches 45-50 psi, the pressure differential is an indication that the filter media are clogged and need to be changed.

The first and second valves, 38 and 52 respectively, may be used to add or delete any required volume of oil from the system. Oil may be drained from the system through drain means 54 so that filter media may be replaced, or when the vacuum oil has become contaminated such that it has reached the end of its useful life. A new volume of oil, or make-up oil at any point in the process, may be added through the inlet means 40 of value 38.

The enclosure 34 retains latent heat generated by the vacuum pump within the enclosure, thereby maintaining the vacuum oil at an elevated temperature, which should be at least 40° C. It should be understood that while the filtration device is illustrated in FIG. 1 outside the enclosure 34, it may be enclosed therein if required to maintain the oil temperature about 40° C. While Applicant does not wish to be held to any specific operating temperature, it is believed that the particulate contaminants entrained in the vacuum oil are more easily removed by the filter media when the vacuum oil is maintained at an elevated temperature. When cooled substantially below 40° C., the particulates tend to crystallize, resulting in substantial plugging of the filter media. When at an elevated temperature (on the order of 40° C., the particulates tend to remain in a more fluid "sludge", which does not plug the filter media, thereby extending the useful life of the filter media. While in many cases the latent heat resulting from the operation of the vacuum pump is sufficient to maintain the oil at a temperature greater than 40° C., in certain instances it may be desirable to heat the oil to maintain the proper temperature. Obviously, such temperature must be less than the manufacturer's recommended temperature at which adverse thermal breakdown of the oil occurs.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. In a vacuum pump having a quantity of vacuum oil for removing airborne particulates from a process gas, an apparatus for filtering and recirculating the vacuum oil, comprising:
   a. an inlet conduit coupled to the vacuum pump for receiving vacuum oil from the vacuum pump;
   b. a first value in the inlet conduit for adding make-up vacuum oil to the vacuum oil;
   c. a plurality of filter means coupled to the inlet conduit for removing particulate contamination from the vacuum oil;
   d. an outlet conduit for receiving filtered vacuum oil from the filter means and for directing the filtered vacuum oil back into the vacuum pump;
   e. a second valve in the outlet conduit for removing a quantity of the filtered vacuum oil;
   f. pump means for circulating the vacuum oil from the inlet conduit through the filter means and through the outlet conduit; and
   g. an enclosure for the vacuum pump for retaining heat within the vacuum oil;
   whereby vacuum oil may be recirculated from the vacuum pump through the filter means and then back into the vacuum pump.

2. The apparatus as recited in claim 1 and wherein: the temperature of the vacuum oil is maintained at a temperature of at least 40° 'C.

3. The apparatus as recited in claim 1 and wherein: the vacuum pump and apparatus are mounted on a moveable cart.

4. The apparatus as recited in claim 1 and wherein: the filter means is capable of moving particulate contamination having a diameter as small as about 0.5 micron from the vacuum oil.

* * * * *